C. T. HENDERSON.
DYNAMIC BRAKING CONTROLLER.
APPLICATION FILED OCT. 2, 1913.
1,154,016.
Patented Sept. 21, 1915.
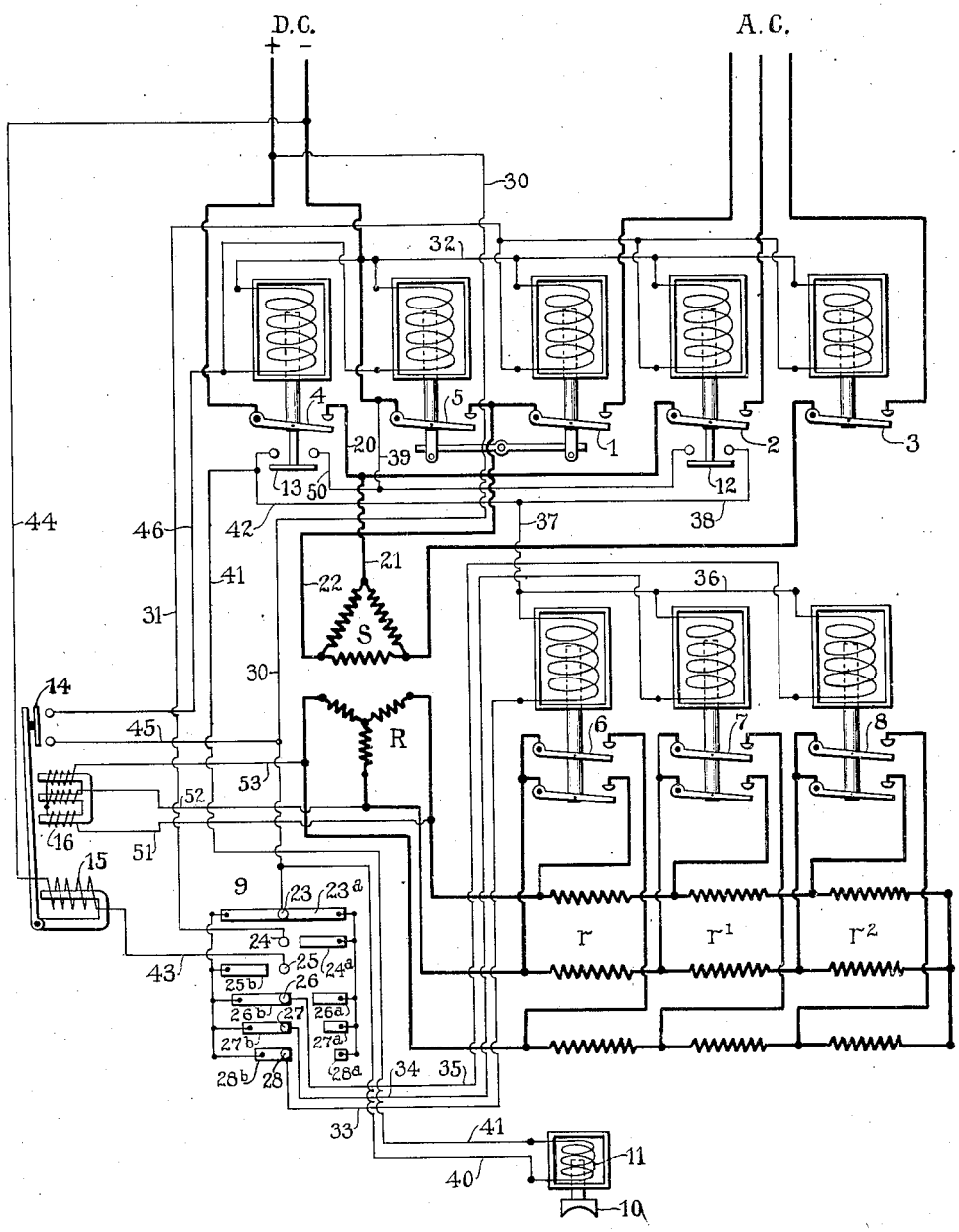

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

DYNAMIC-BRAKING CONTROLLER.

1,154,016.     Specification of Letters Patent.     Patented Sept. 21, 1915.

Application filed October 2, 1913. Serial No. 793,065.

*To all whom it may concern:*

Be it known that I, CLARK T. HENDERSON, a citizen of the United States, residing at Milwaukee, in the county of Milwaukee and State of Wisconsin, have invented new and useful Improvements in Dynamic-Braking Controllers, of which the following is a full, clear, concise, and exact description, reference being had to the accompanying drawing, forming a part of this specification.

My invention relates to improvements in dynamic braking controllers for alternating current motors. It is particularly applicable to controllers such as that disclosed in my co-pending application, Serial No. 520,128, filed Sept. 29, 1909, but may be advantageously employed with other forms of controllers.

One of the objects of the invention is to provide means insuring maintenance of the dynamic braking connections until the motor is brought substantially to rest or its speed reduced to a predetermined degree.

A further object is to provide for automatic interruption of the dynamic braking connections at the proper time.

A further object is to provide, in conjunction with the dynamic brake, a mechanical brake and means for withholding the mechanical brake until the motor is brought substantially to rest or to the desired speed and for effecting automatic setting thereof at the proper time.

Various other objects and advantages of my invention will appear hereinafter.

For the purpose of more fully and clearly disclosing the nature and advantages of my invention, I shall describe the embodiment thereof illustrated in the accompanying drawing, in which it has been applied to a controller substantially the same as that disclosed in my co-pending application, aforesaid. It should, of course, be understood that my invention is susceptible of embodiment in other forms.

As in my co-pending application, this controller is provided with switches for connecting the stator of the motor to either an A. C. circuit for running or a D. C. circuit for dynamic braking, and other switches controlling resistance in the rotor circuit of the motor for both acceleration and dynamic braking. Also, it is provided with a mechanical brake but the brake is controlled in a different manner.

The motor is diagrammatically illustrated as provided with a stator S and a rotor R. Electro-responsive switches 1, 2 and 3 are provided to connect the stator to an alternating current circuit A. C., while electro-responsive switches 4 and 5 are provided for connecting the stator to a direct current circuit, D. C. Electro-responsive switches 6, 7 and 8 are provided for controlling sets of resistances $r$, $r'$ and $r^2$ in the rotor circuit of the motor. All of these switches are under the control of a master switch 9 movable in one direction to energize switches 1, 2, 3, 6, 7, and 8 to start and accelerate the motor and in an opposite direction to energize switches 4, 5, 6, 7, and 8 for dynamic braking. As will be understood the connection of the stator to the D. C. circuit establishes a stationary field for the motor, whereby when the rotor is driven it generates a dynamic braking current in the rotor circuit and that by varying the resistance in the rotor circuit the dynamic braking current may be regulated to regulate the dynamic braking effect on the motor.

The drawing also shows schematically a mechanical brake 10 having a releasing winding 11 controlled by auxiliary switches 12 and 13 on electro-responsive switches 2 and 4 respectively. The arrangement is such that when the switch 2 responds to connect the motor to the A. C. circuit it energizes the brake coil 11 while the switch 4 upon responding to connect the motor to the D. C. circuit maintains the coil 11 energized until said latter switch opens to interrupt the dynamic braking connections.

The additional features of the present controller include a relay switch 14 for controlling the dynamic braking switches 4 and 5 in a manner hereinafter set forth. This switch is provided with an operating winding 15 and with a retaining magnet 16. The operating winding 15 is connected to the D. C. circuit and is controlled by the master switch 9. The retaining magnet 16, on the other hand, is connected to the rotor circuit of the motor, and is preferably provided with one coil for each phase of said rotor circuit. As shown, the rotor circuit is three-phase and the magnet 16 is provided with three coils having star connections with the rotor circuit.

The relay 14 responds to the master controller to energize the switches 4 and 5 for dynamic braking and upon responding is held by the magnet 16. The magnet 16 being connected as described to the rotor circuit, is energized by the dynamic braking current and accordingly holds the relay in operative position independently of the operating winding 15. It insures maintenance of the dynamic braking connections until the dynamic braking current decreases to such a value as to render the magnet 16 ineffective. Hence, by proper design of the magnet 16 the same may be caused to hold the relay until the dynamic braking current is reduced to any predetermined value and the speed of the motor reduced to a corresponding value. In practice, the magnet 16 is preferably so designed as to hold the relay and thus maintain dynamic braking connections until the motor is brought substantially to rest.

As will now be obvious the relay 14 also insures the withholding of the mechanical brake until the motor has been slowed down to the desired speed and the dynamic braking connections thus interrupted. As heretofore set forth, the release coil 11 of the brake is maintained energized so long as the switch 4 remains closed and hence so long as the relay 14 remains closed. When, however, the relay 14 is released and the switch 4 is deënergized the brake coil 11 is likewise deënergized, thereby causing automatic setting of the brake 10 at the desired time. Thus, regardless of the operation of the master controller the dynamic braking connections, when once established, are maintained and the mechanical brake withheld until the motor is brought substantially to rest or reduced to a predetermined speed, whereupon the dynamic braking connections are interrupted and the mechanical brake set.

The circuit connections of the controller illustrated will now be more particularly described: The rotor circuit and the connections of the stator to the A. C. circuit by the switches 1, 2, and 3, are shown in heavy lines and are so obvious as to require no description. The stator connections established by the switches 4 and 5 are as follows: from the left hand side of the D. C. circuit, through switch 4, by conductors 20 and 21, through the stator S, by conductor 22, through switch 5 and thence to the right hand side of the D. C. circuit.

The master switch has a contact finger 23 and a coöperating segment $23^a$ providing a permanent connection to one side of the D. C. circuit. In addition it has contact fingers 24, 25, 26, 27, and 28 with which coöperate two sets of contact fingers. One set includes segments $24^a$, $26^a$, $27^a$, and $28^a$ and the other includes segments $25^b$, $26^b$, $27^b$, and $28^b$. As shown, the master controller is in off position and in this position the segments $26^b$, $27^b$, and $28^b$ engage contacts 26, 27, and 28 respectively. The controller when moved to cause engagement between the contact fingers and the $a$ segments, establishes running connections and when moved to cause engagement between the contact fingers and the $b$ segments establishes dynamic braking connections.

Assuming now that the controller is moved in the former direction, it first establishes a circuit from the left hand side of the D. C. circuit by conductor 30 to contact finger 23 and segment $23^a$, thence to segment $24^a$ and finger 24, by conductor 31 through the operating windings of switches 1, 2, and 3 in parallel, to conductor 32 and thence to the right hand side of the supply circuit. Continued movement of the controller then successively connects contact fingers 26, 27, and 28 through their respective segments, to segment 23, thereby energizing the windings of switches 6, 7, and 8 through conductors 33, 34 and 35 respectively. These operating windings have a common return by conductors 36, 37, and 38 through auxiliary switch 12 of switch 2, by conductor 39 to the left hand side of the D. C. circuit. The brake coil 11 is energized immediately upon closure of switch 2, the circuit of this coil extending from conductor 30 by conductor 40 through said coil, by conductors 41 and 42 to conductor 38 and thence to the supply line, as just traced. This, of course, provides for starting and accelerating the motor.

Assume now that the controller is moved to cause engagement of segment $25^b$ with contact finger 25. This results in deënergizing switches 1, 2, 3, 6, 7, and 8 and energizing operating coil 15 of relay 14. The circuit of the coil 15 is completed from conductor 30 through contact finger 23, segment $23^a$, segment $25^b$, finger 25, by conductor 43 through said winding, by conductor 44 to the left hand side of the D. C. circuit. The relay 14 thereupon responds, completing the circuits of the operating windings of switches 4 and 5 from conductor 30 by conductor 45, through said relay switch, by conductor 46 through said windings in parallel, to the left hand side of the D. C. circuit. The switches 4 and 5 thereupon respond, connecting the stator of the motor to the D. C. circuit and completing the circuit of the brake coil 11 from conductor 41 through auxiliary switch 13, by conductor 50 to conductor 39. In the meantime, segments $26^b$, $27^b$, and $28^b$ have engaged fingers 26, 27, and 28 and accordingly when the switch 4 closes switches 6, 7, and 8 are energized as before described, except that their return circuit extends from conductor 37 through auxiliary switch 13 of switch 4 instead of auxiliary switch 12 of switch 2. Under these conditions the motor acts as a dynamic brake and all of the resistance is excluded from the rotor circuit. If now it is desired to regulate the dynamic braking current, this can be accomplished by continuing the movement of the controller to successively disengage segments 28$^b$, 27$^b$, and 26$^b$ from their corresponding contact fingers, thereby successively reinserting the resistances $r$, $r'$ and $r^2$ in the rotor circuit.

The three terminals of the retaining magnet 16 are connected by conductors 51, 52 and 53 to the three phases of the rotor circuit, and accordingly said magnet is subjected to the dynamic braking current in all phases of the rotor circuit. When the relay 14 is released it deënergizes switches 4 and 5 and switch 4, upon opening, deënergizes the brake coil 11 and the operating windings of switches 6, 7, and 8 through the medium of its auxiliary switch 13.

What I claim as new and desire to secure by Letters Patent is:

1. The combination with an alternating current motor, of alternating and direct current sources, means operable to connect said motor to said alternating current source for running, means operable to connect said motor to said direct current source for dynamic braking but tending to disconnect said motor therefrom and holding means for said last mentioned means responsive to the dynamic braking current.

2. The combination with an alternating current motor, of direct current and alternating current sources, means for connecting said motor to said alternating current source for running and means for connecting said motor to said direct current source for dynamic braking, said last-mentioned means being maintained effective by the dynamic braking current and automatically interrupting the direct current connections when the dynamic braking current falls below a certain limit.

3. The combination with an alternating current motor, of separate sources of current, means for connecting said motor to one of said sources for running, electro-responsive means for connecting said motor to the other of said sources for dynamic braking, said electro-responsive means when deënergized tending to disconnect said motor from said latter source, manual means for controlling said electro-responsive means at will, and means governed by the dynamic braking current for maintaining said electro-responsive means effective for dynamic braking independently of said manual means.

4. In an alternating current motor controller, in combination, a switch for effecting stator connections for dynamic braking, and a retaining magnet for said switch energized by the dynamic braking current generated in the rotor circuit.

5. The combination with an alternating current motor, of a source of alternating current, a source of direct current, means for connecting said motor to said sources selectively for running and for dynamic braking, an electrically controlled mechanical brake for said motor to be energized from said source of direct current and controlling means for said brake including an electro-responsive device responsive to the dynamic braking current of said motor to maintain said brake inoperative until said motor is substantially brought to rest.

6. The combination with an alternating current motor, of a source of alternating current, a source of direct current, means for connecting said motor to said sources selectively for running and for dynamic braking, an electrically controlled mechanical brake for said motor to be energized from said source of direct current and controlling means for said brake including means operatively connected to said first mentioned means and an electro-responsive device responsive to the dynamic braking current of said motor.

7. The combination with an alternating current motor, of means for establishing dynamic braking connections therefor, a mechanical brake, and common means insuring against interruption of said connections and application of said mechanical brake until the motor is brought substantially to rest.

8. The combination with an alternating current motor, of electro-responsive means for establishing dynamic braking connections therefor, an electrically controlled mechanical brake, and means controlled by the dynamic braking current generated by said motor to control both of said former means.

9. The combination with an alternating current motor, of electro-responsive means for establishing dynamic braking connections therefor, an electrically controlled mechanical brake, and means governed by the dynamic braking current to insure the maintenance of said connections and the withdrawal of said mechanical brake until the motor is brought substantially to rest and then effecting automatic interruption of said connection and application of said mechanical brake.

10. In a controller for alternating current motors, in combination, means for establishing dynamic braking connections for the motor, and means for maintaining said former means effective including an electromagnet connected in the rotor circuit and provided with a coil for each phase of the rotor circuit.

11. In a controller for alternating current motors, in combination, means for establishing direct current connections for the stator for dynamic braking, and a relay controlling the operation of said former means, said relay having an operating winding and a retaining magnet, said magnet being connected in the rotor circuit.

12. In a controller for alternating current motors, in combination, means for connecting the stator of the motor to a source of direct current for dynamic braking, an electrically controlled mechanical brake, controlled by said former means, and a relay controlling the operation of said first-mentioned means and being governed by the dynamic braking current generated by the motor.

In witness whereof, I have hereunto subscribed my name in the presence of two witnesses.

CLARK T. HENDERSON.

Witnesses:
FRANK H. HUBBARD,
JEANETTE S. BROCK.